UNITED STATES PATENT OFFICE.

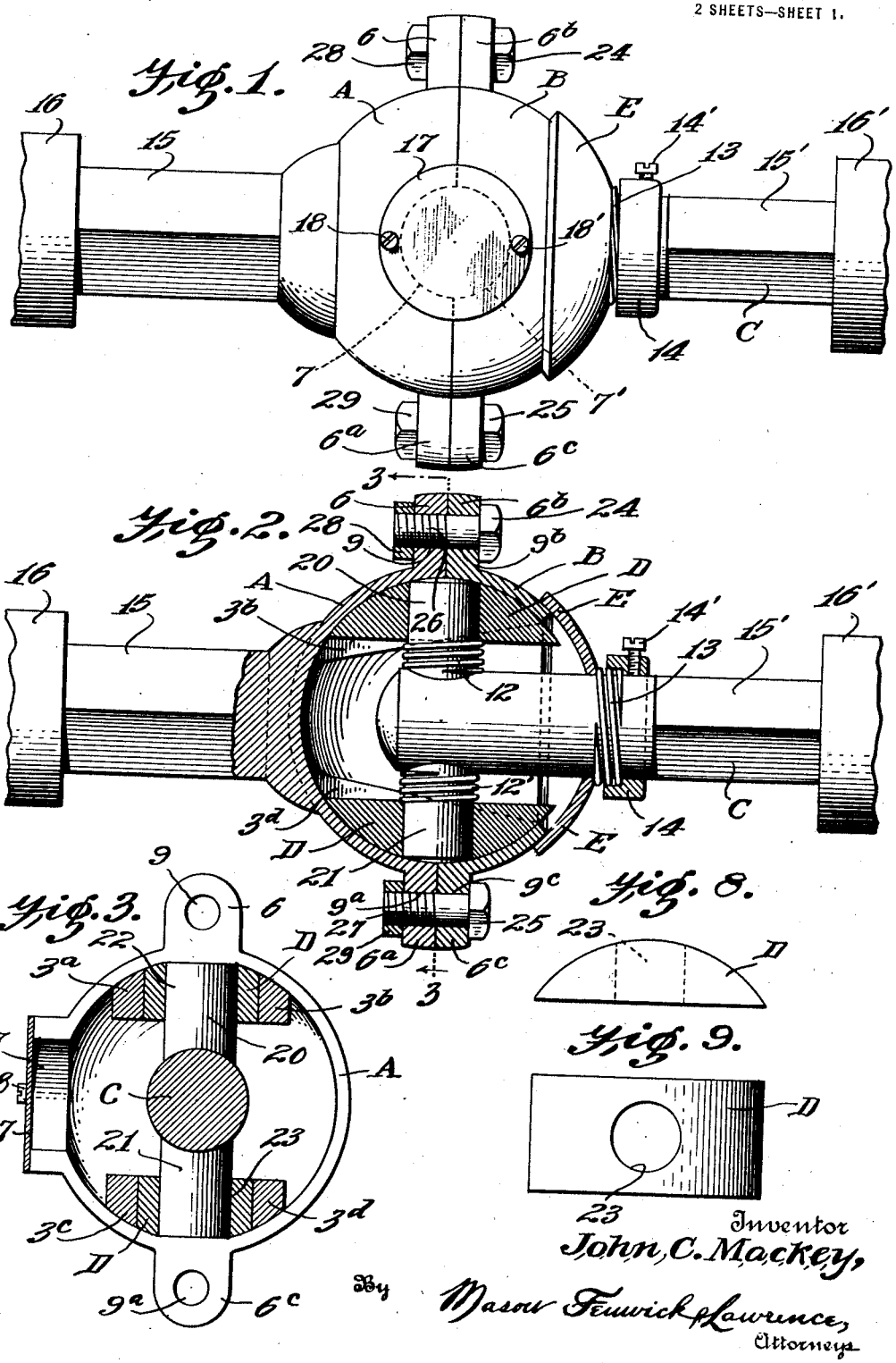

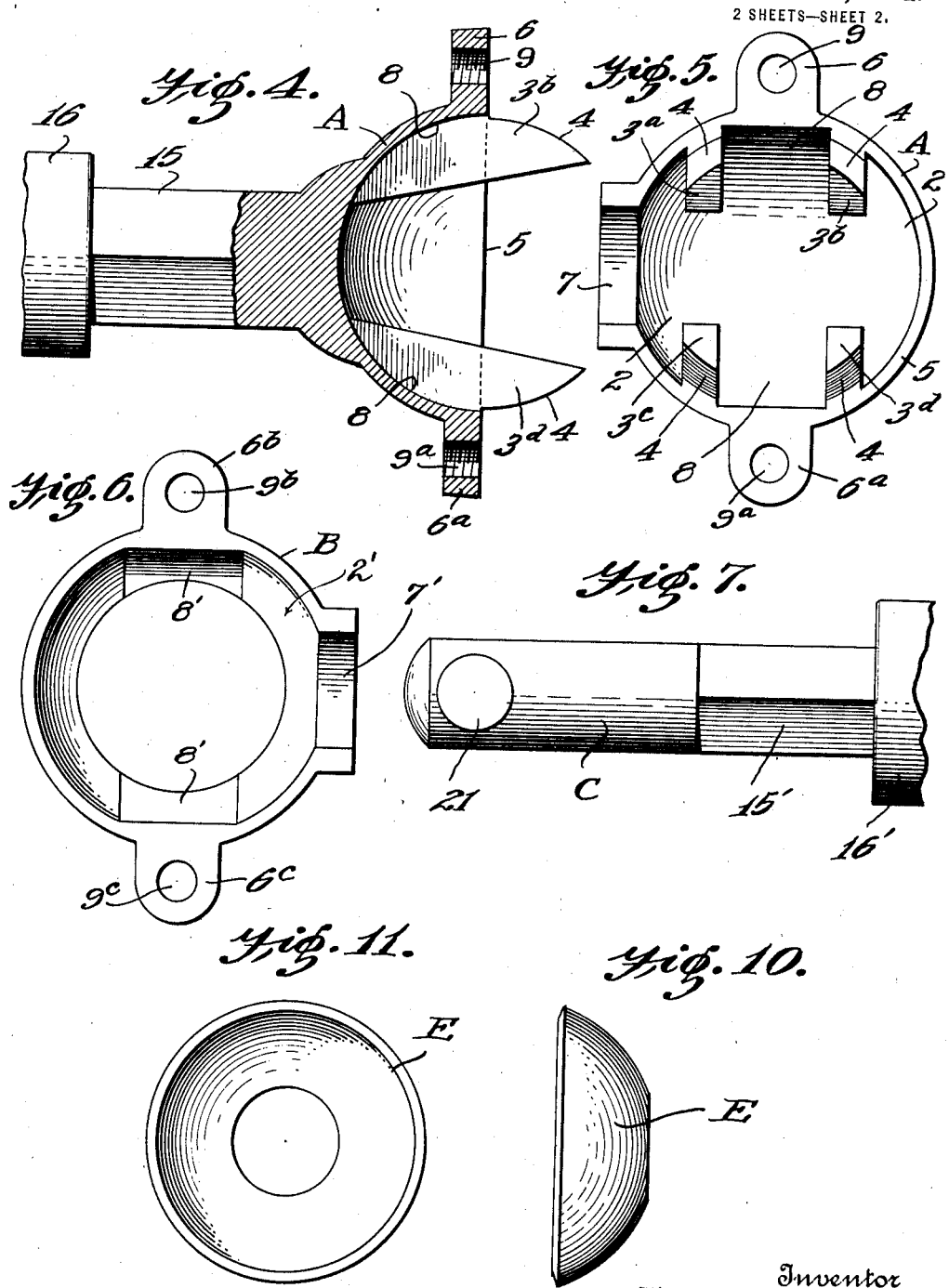

JOHN C. MACKEY, OF AKRON, OHIO, ASSIGNOR OF ONE-HALF TO CHARLES S. MILEY, OF AKRON, OHIO.

UNIVERSAL JOINT.

1,364,842.  Specification of Letters Patent.  Patented Jan. 4, 1921.

Application filed August 6, 1919. Serial No. 315,778.

*To all whom it may concern:*

Be it known that I, JOHN C. MACKEY, a citizen of the United States, residing at Akron, in the county of Summit and State of Ohio, have invented certain new and useful Improvements in Universal Joints; and I do hereby declare the following to be a full, clear, and exact description of the invention, such as will enable others skilled in the art to which it appertains to make and use the same.

This invention relates to shafts and particularly to couplings for shafts, especially to what is commonly known as universal joints.

A further object of this invention is to provide a more efficient universal joint and one having less wear in the parts; one that is noiseless, easily and quickly assembled, and one that is quickly and cheaply manufactured.

With these and other objects in view, as will become readily manifest to those skilled in the art, the invention consists in the means and in details and arrangement of the elements thereof as more particularly described in the following specification relative to the embodiment of the invention illustrated in the accompanying drawings, in which:

Figure 1 is a side elevation of my universal joint.

Fig. 2 is a longitudinal section in elevation medial of Fig. 1.

Fig. 3 is a vertical section at 3—3 of Fig. 2.

Fig. 4 is a longitudinal section of member A in Fig. 1.

Fig. 5 is an end view of Fig. 4.

Fig. 6 is an end view of cap B in Fig. 1, looking into the inside thereof.

Fig. 7 is a side elevation of shaft section C in Fig. 1.

Fig. 8 is a side elevation of arcuate member D in Fig. 2.

Fig. 9 is a plan view of Fig. 8.

Fig. 10 is a side view of the bell-shaped packing E in Fig. 1.

Fig. 11 is an inside end view of Fig. 10.

This improved shaft coupling comprises six principal members as follows:

The member A comprising a shank or shaft section terminating at one end in a hemispherical hollow head having interior cylindrical guideways curved in a plane including the axis of said shank; the member B constituting a hollow cap for the hemispherical head of said member A and forming with said head an approximation of a sphere; said member B having an opening to admit of shaft section C; the shaft section C, constituting a flexing member cooperating with said members A and B; two arcuate members D adapted to engage in the guide ways of the hemispherical head of member A, and move therein in a circular path, and also perforated to receive trunnion pins projecting transversely from the shaft section C to permit a pivotal movement about an axis transverse of the movement of said arcuate members D; a cup like member E, having spherical interior and exterior surfaces, sleeved over shaft section C, and closing the opening in cap B.

The member A of my universal shaft coupling comprises preferably a squared shank 15 adapted to slide within a squared opening in a shaft 16 and a hemispherical head hollowed at 2 and having a plane end face 5 perpendicular to the axis of the shank and lying in an equatorial plane. Laterally projecting ears 6 and 6$^a$ shown as perforated at 9 and 9$^a$ adapting the member A to have secured to it the said cap B to be subsequently described. The hemispherical head of the member A is hollow and within it project two pairs of guide ribs 3$^a$, 3$^b$, on one side and 3$^c$, 3$^d$, on the other side, said guide ribs merging into projecting portions extending beyond the plane face of the hemispherical head and trued to the interior surface of the cap B on their outer edges as at 4. These spaced ribs form guiding grooves between them providing for cylindrical surfaces 8 with which they constitute bearing guides for the said members D. The inner edges of said ribs diverge toward their projecting ends to facilitate withdrawing of the pattern from the molds preparatory to casting said member A.

The cap B is of spherical contour and has an equatorial plane face corresponding in every respect to the plane face of the member A. Said cap B is hollow, has projecting ears 6$^b$ and 6$^c$ provided with perforations at 9$^b$ and 9$^c$, respectively, and the said cap B is adapted to be secured to the member A by means of bolts 24, 25, passing through the perforations of the ears of the member A and the cap B, and secured by nuts 28, 29, as shown.

The interior surface of the member A is intended to be milled or ground between the said guide ribs to form cylindrical smooth bearing surfaces 8, referred to, between said ribs. Corresponding cylindrical surfaces 8' are milled in the cap B and these surfaces register perfectly with the corresponding surfaces 8 in the interior of the member A.

When the cap B is assembled with the member A the projecting portions of the guide ribs fit within the hollow of the cap B and terminate at the edge of a round opening concentric with the axis of the shank 15 to admit entrance of the mating coupling member C.

The member C comprises a squared shank 15' adapted to fit within a squared opening in a shaft 16'. At the end opposite the shank 15' are transversely projecting trunnion pins 20 and 21. Said trunnion pins fit into orifices in the arcuate bearing members D, said bearing members D being designed to fit between the said ribs $3^a$, $3^b$, $3^c$ and $3^d$ and to be guided on the bearing surfaces 8, 8' therebetween so as to rock or rotate in a plane parallel with the axis of the shank 15. Surrounding the trunnions 20 and 21 are springs 12 and 12' adapted to press the bearing members D outward and into contact with the guiding surfaces 8, 8' in the hemispherical head A and cap B.

Surrounding member C is the said packing cup E. The packing cup E is pressed against the exterior surface of the cap B by a spring 13 placed between said cup E and the collar 14 secured to the member C by the set screw 14'. It will be seen that the cup E maintains the opening in the cap B closed whatever the angular position of the members A and C may be.

Semi-annular bosses 7 and 7' are formed on the hemispherical head of the member A and on the cap B, respectively, adapted, when the members are assembled, to provide a cylindrical opening into the interior of the hollow body thus formed at right angles to the axis of the shank 15. The opening thereby provided may be used for inserting oil or grease within the joint. A cap plate 17 closes the opening and is secured in place by the screws 18 and 18'.

Member A is preferably made in the following manner: A steel casting is made cored at 2—2 in Fig. 5, leaving four ears, $3^a$, $3^b$, $3^c$, $3^d$, projecting beyond its normal face, as better shown in Figs. 2, 4 and 5. These ears are turned down as shown at 4 in Fig. 4 to make room for rough interior 2' of cap B, and the member is then faced at 5 facing also ears 6 and $6^a$. It is then recessed in semi-circular form at 7 to allow for the arbor of a milling cutter. A milling cutter having the same diameter as that from which the arcuate member D is struck is then used. This milling cutter also has the same width, allowing for clearance, as arcuate members D. This milling cutter is then sunk into slot 8 which has been left with sufficient metal for cutting into slot 8 until the arbor sinks to the base of recess 7.

Cap B is machined substantially in the same manner as member A. A recess 7' like recess 7, serves as a sink for an arbor of a milling cutter.

Cap B is in rough formation on its interior and is milled at 8' in a similar manner to that in which member A is milled at 8, the milling cutter substantially finishing the roughened surface by forming a groove like groove 8 and complementary to groove 8.

The arcuate members D are held yieldingly against the inner wall of cap B by a coiled spring 13. Spring 13 is held internal of shaft collar 14, and shaft collar 14 is held fixed by set screw 14'.

Member A and pitman C are squared at 15 and 15' to mate with the recess in shaft couplings 16 and 16'.

Trunnions 20 and 21 are on member C and engage in holes 22 and 23 in arcuate members D.

In assembling the parts of the described coupling the cap B, packing cup E, spring 13 and collar 14 will be slipped over the coupling member C and the spring 12 and 12' will be placed on the trunnion pins 20 and 21 and the arcuate members D assembled on said trunnion pins. Then the member C carrying the arcuate members D may be coupled with the member A, the plane face of cap B be brought against the plane face of the member A, the bolts 24 and 25 inserted through the ears and the nuts screwed tight. After that the collar 14 may be properly adjusted so as to place the packing cup E in appropriate position.

What I claim is:

1. In a universal joint, a socket member having an interior contour conforming to a sphere and having a portion of said interior contour machined in cylindrical formation for a track for pivotal bearing and having stops in the sides of said track, said stops being of arcuate formation and being at an angle of substantially ten degrees to the axis of the shank of said socket.

2. In a universal joint, a shank terminating in a socket member conforming to a hemisphere having a plane face at right angles to the axis of said shank, interior spaced guide ribs merging into projecting portions, the inner edges of said ribs diverging toward their extremities for the purpose set forth.

3. In a universal joint, a hollow member having a bearing guide, a member coupled thereto having a shank with trunnion pins at right angles to its axis, a pair of arcuate members pivoted to said trunnion pins, and springs surrounding said trunnion pins and pressing said arcuate members outward to engage said bearing guide.

4. In a universal joint, a member comprising a shank having an enlarged hemispherical end with a hollow interior, parallel guide ribs projecting from said interior surface and merging into ends projecting beyond the face of said hemispherical head whereby the ends of said guide ribs serve as stops to limit the angular movement of a coöperating coupling member.

5. In a universal shaft coupling, the combination of a coupling member having internal bearing guides curved in a plane parallel with the axis of rotation of said member, a coöperating coupling member having trunnions projecting transverse of the axis of rotation, arcuate members bearing on said bearing guides and pivoted on said trunnions, and springs arranged to urge said arcuate members outward into engagement with said bearing guides.

6. In a universal shaft coupling, the combination of a member having a shank terminating in a hemispherical head having a plane face perpendicular to the axis of said shank, spaced ribs within said hemispherical head forming bearing guides, the bearing surfaces between them being curved in a plane parallel with the axis of said shank, said ribs projecting from said head beyond said face and having their outer edges conforming to the curvature of the interior of said head, a spherically curved hollow cap having a plane face fitted to said plane face of the hemispherical member and secured thereto, a member universally coupled with said first named member comprising a shaft section, arcuate members pivoted thereto and seated in said curved bearings between said guide ribs on said first named member.

7. In a universal coupling, a coupling member comprising a shank having a hemispherical hollow head, a spherically formed cap adapted to be secured to said spherical head, said head and cap having semicylindrical openings in their meeting edges at right angles to the axis of rotation of said member, and a removable closure for the orifice formed by said semicylindrical openings.

8. A universal shaft coupling comprising a shank having a hemispherical head provided with a face perpendicular to the axis of rotation of said shank, a spherically formed cap secured to said face, guide ribs projecting from the inner surface of said head and extended beyond the face into the interior of said cap, an opening in said cap concentric with the axis of said member, the projecting portion of said ribs terminating at the edge of said opening, a coöperating coupling member, arcuate members, trunnions on said coöperating member extending transversely thereof and pivoted to said arcuate members, said arcuate members adapted to move on bearing surfaces between said ribs substantially as and for the purpose set forth.

In testimony whereof I affix my signature.

JOHN C. MACKEY.